G. HANCOCK.
Sewing-Machine.

No. 8,028. Reissued Jan. 8, 1878.

Attest:
J. M. McNeill
W. B. Acker.

Inventor:
George Hancock.
Per. Parker W. Gwyn Jr. & Co.
Attys.

N. PETERS, PHOTO-LITHOGRAPHER, WASHINGTON, D. C.

UNITED STATES PATENT OFFICE.

GEORGE HANCOCK, OF PROVIDENCE, RHODE ISLAND.

IMPROVEMENT IN SEWING-MACHINES.

Specification forming part of Letters Patent No. 168,989, dated October 19, 1875; Reissue No. 8,028, dated January 8, 1878; application filed February 28, 1876.

*To all whom it may concern:*

Be it known that I, GEORGE HANCOCK, of Providence, in the county of Providence and State of Rhode Island, have invented certain new and useful Improvements in Sewing-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to improved mechanism for operating the shuttle of sewing-machines from the same shaft which operates the needle, the object being to render the operation of the same noiseless, and capable of simple and cheap reparation from the effects of wear; and my invention, for this purpose, consists of a combination of an eccentric and strap on the driving-shaft, and a sliding connection between the same and a vertical lever, and a universal joint or connection between the actuating end of the said lever and another horizontal lever that operates the shuttle beneath the table of the machine, so that the rapid changes of motion may be made without noise and without excessive wear of the parts, and with provision for repairing wear of the parts at small expense.

Figure 1:
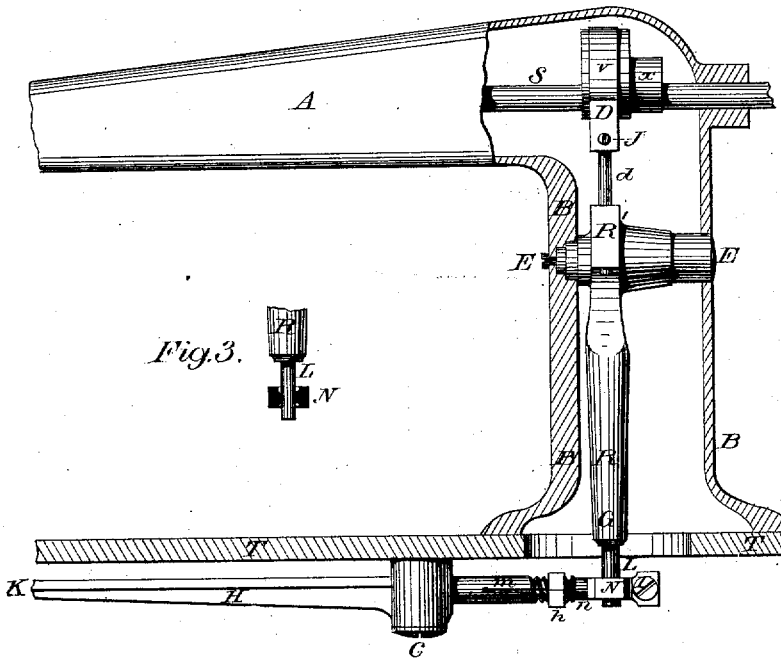
Figure 2:
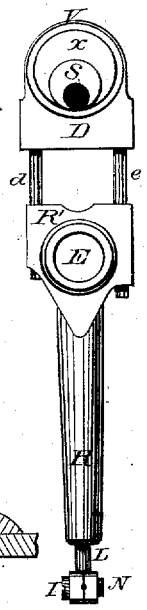
Figure 4:
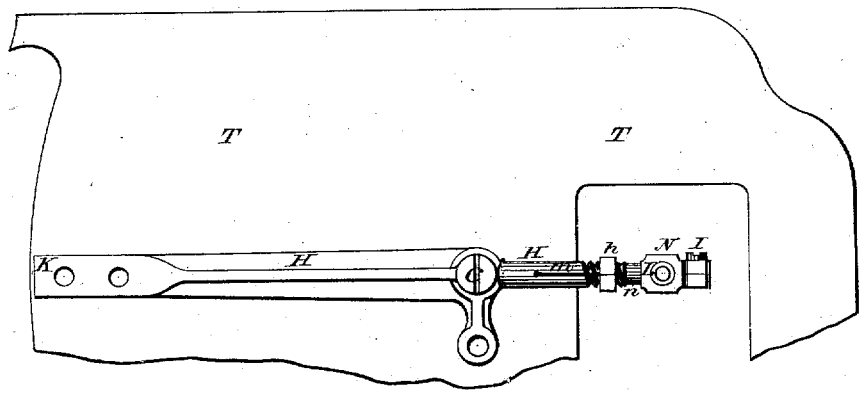

Referring to the drawings, Figure 1 is an elevation and section of the frame of a sewing-machine, showing the mechanism which constitutes my said improvement. Fig. 2 is a rear elevation of the said mechanism separately. Fig. 3 is an elevation and cross-section of the parts at the lower end of Fig. 2. Fig. 4 is a plan and view of the under side of the table in Fig. 1.

Similar letters of reference indicate like parts in the several figures.

Fig. 1 of the drawings shows the improved mechanism arranged with a vertical section of the sewing-machine table T and upright B and arm A, in which the shaft S has bearings, and operates the needle-bar at the front of the machine in the usual way. An eccentric, X, is secured on this shaft, with a surrounding strap, V, extending from a block, D, beneath, in which are secured two rods, *d* and *e*. These rods extend into sockets provided to receive them, so they can slide therein in the upper part of the vertical lever R, which is pivoted at E in the upright B of the machine-frame. The said rods thus form a sliding connection adapted to convert the rotary movement of the said eccentric into the vibratory movement of the vertical lever positively; and the free end G of the said lever is formed with a pivot, L, which forms part of a universal joint or connection with the contiguous end of the horizontal lever H, which is pivoted at C to the under side of the table, and drives the shuttle at the opposite end K. The said universal joint beside the pivot L comprises a clasping-socket, N, with a V-shaped bearing, which grasps the pivot L, as shown in Fig. 3, and is adjustable therewith by means of the set-screw I. This socket has a pivot, *n*, which extends into a sleeve *m*, forming the end of the horizontal lever H, which sleeve is split, and has a screw-nut, *h*, on the outside to compress the pivot *n* in its sleeve, for the purpose of taking up any lost motion at this point.

By the construction and arrangement of the several parts, as described, the rotary movement of the eccentric X on the main shaft is transmitted freely and positively to the upright lever R by means of the said sliding connection, and the vibratory movement thereby produced is transmitted to the horizontal shuttle-lever H through the universal connection at the junction of the two levers, as described, by means of which all loss of movement is provided for beforehand, and, besides, means are provided to take up the parts and prevent loss of movement that is produced by after use and wearing of said parts.

The two rods *d* and *e* are secured in the block D of the eccentric strap by set-screws J, Fig. 1, and said rods are simply lengths of round steel wire, which, when completely worn, can be replaced by new ones at a very slight expense; and before such replacement becomes necessary the rods may be turned in the sockets when they have become worn, and a fresh surface presented to sustain the wear.

It will also be seen that, from the construction and arrangement of the said connection, the rapid reciprocating movement of the parts is rendered entirely noiseless, even when perceptibly worn.

Having thus described my invention, what I claim as new, and desire to secure by Letters Patent, is—

1. In a sewing-machine, the combination of the universal joint, consisting of the pivot L, clasping-socket N, having a V-shaped bearing, which grasps the said pivot, and adjustable thereto through the medium of the set-screw I, pivot *n*, adapted to be adjusted in the sleeve *m* on the end of the horizontal lever H, said sleeve *m* being split and provided with a nut, *h*, the several parts being constructed and arranged to operate in connection with each other, substantially in the manner as and for the purpose specified.

2. In a sewing-machine, the combination, with the vertical lever R, provided with the pivot L and head-block R′, and lever H, having the clasping-socket N, of the block D, provided with the rods *d* and *e*, and the eccentric strap V, overlapping the eccentric X, substantially as and for the purpose set forth.

In testimony that I claim the foregoing I have hereunto set my hand.

GEORGE HANCOCK.

Witnesses:
C. WESTCOTT,
NATHAN F. SMITH.